United States Patent
Park et al.

(10) Patent No.: US 8,639,470 B2
(45) Date of Patent: Jan. 28, 2014

(54) DIGITAL CUMULATIVE SPECTRUM ANALYSIS APPARATUS AND METHOD FOR DIRECTION FINDING AND LOCATION

(75) Inventors: Gwangmoon Park, Daejeon (KR); Sang-Tae Kim, Daejeon (KR); Seong-Yun Lee, Daejeon (KR); Haeng-Sook Ro, Daejeon (KR); Mi-Kyung Suk, Daegu (KR); Heung-Yong Kang, Daejeon (KR); Yong-Seok Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 530 days.

(21) Appl. No.: 12/868,496

(22) Filed: Aug. 25, 2010

(65) Prior Publication Data

US 2011/0103452 A1 May 5, 2011

(30) Foreign Application Priority Data

Oct. 29, 2009 (KR) ........................ 10-2009-0103684

(51) Int. Cl.
*G01C 17/00* (2006.01)
(52) U.S. Cl.
USPC ........................................................ 702/151

(58) Field of Classification Search
USPC .......................................................... 702/151
See application file for complete search history.

(56) References Cited

U.S. PATENT DOCUMENTS

| | | | |
|---|---|---|---|
| 2005/0057253 A1 | 3/2005 | Gee et al. | |
| 2011/0124266 A1 | 5/2011 | Lucas et al. | |

FOREIGN PATENT DOCUMENTS

| | | | |
|---|---|---|---|
| JP | 2007-064941 A | 3/2007 | |
| JP | 2007-064947 A | 3/2007 | |

*Primary Examiner* — Stephen Cherry
(74) *Attorney, Agent, or Firm* — Rabin & Berdo, P.C.

(57) ABSTRACT

A digital spectrum analysis apparatus and method for direction finding (DF) and location is provided. The digital spectrum analysis apparatus for single-channel direction finding includes: a digital processing unit configured to receive a signal, convert the received signal into a digital signal, reduce a sampling rate of the digital signal by using a digital down converter (DDC), and convert the digital signal into a baseband complex signal; a spectrum processing unit configured to map a bearing and a power level of the baseband complex signal into coordinate system, and allocate different colors to the power levels depending on the accumulation ratio of the power levels; and a display unit configured to display the power levels with colors in order to estimate the bearing of the signal.

9 Claims, 4 Drawing Sheets

DIGITAL CUMULATIVE SPECTRUM ANALYSIS APPARATUS AND METHOD FOR DIRECTION FINDING AND LOCATION

CROSS-REFERENCE(S) TO RELATED APPLICATIONS

The present application claims priority of Korean Patent Application No. 10-2009-0103684 filed on Oct. 29, 2009, which is incorporated herein by reference in its entirety.

BACKGROUND OF THE INVENTION

1. Field of the Invention

Exemplary embodiments of the present invention relate to a digital cumulative spectrum analysis apparatus and method for direction finding (DF) and location; and, more particularly, to a digital cumulative spectrum analysis apparatus and method for DF and location using radio waves.

2. Description of Related Art

In general, electromagnetic waves which are energy generated from electric and magnetic flows are also referred to as radio waves. That is, when vibration occurs as electricity flows, an electric field and a magnetic field are generated at the same time. The electric field and the magnetic field periodically change to generate electromagnetic waves. Such electromagnetic waves always exist around us.

Since electromagnetic waves exist anytime and anywhere, various interferences occur among devices using electromagnetic waves. Therefore, devices such as mobile phones, which operate at an allocated frequency band, should be manufactured in such a manner that interference caused by the leakage of radio frequency (RF) into contiguous frequencies does not occur. However, since digital RF units, e.g., mobile phones, wireless LAN devices, Digital Multimedia Broadcasting (DMB), and RF Identification (RFID) devices exist on a wireless network, it is not easy to prevent interference among devices. Devices operating at the license-exempt band should normally operate even though interference exists. Furthermore, in order to reduce the interference, it is necessary to transmit output of devices with a low power for a short period.

The respective RF systems have the same amount of radio resources in all areas. However, a certain RF system may have an insufficient amount of radio resources in the same specific area, and another RF system may not be used. Therefore, the new type of RF technique such as Software-Defined Radio (SDR) and a Cognitive Radio (CR) has been researched in order to solve the above-described problems.

The SDR and CR are technologies which minimize the interference among devices to effectively use a limited radio spectrum. To effectively use the radio spectrum even in a complicated and diversified radio environment with the development of the RF technologies, measurement equipments to monitor RF services should reliably detect and analyze RF signals having a low power and a short duration time, and find the position of an interference which is to be removed.

A spectrum analyzer may be taken as an example of the device for detecting and analyzing RF signals. The spectrum analyzer measures time-domain signals at a frequency domain, and displays the measured signals on a screen. The spectrum analyzer may transform an RF signal from the time domain to a frequency domain through Discrete Fourier Transform (DTF) so as to calculate the magnitude of the signal at the frequency domain.

The spectrum analyzer displays the intensities of signals for each frequency component. At this time, a horizontal axis may be expressed by the unit of kHz/Div or MHz/Div which is referred to as a horizontal-axis frequency span (span/div).

However, such a spectrum analyzer has a sweep time during which a signal returns to a start point during the measurement of the signal. Therefore, since the measurement of signal is performed discontinuously, a certain signal may be omitted. When the omitted signal contains important information, the information may not be recognized. Furthermore, since the existing digital spectrum analyzer for direction finding has a limit in the number of spectrums per frame on a display, a data loss may occur when the data is processed at a high rate. In addition, the existing digital spectrum analyzer for direction finding could not observe a low-level signal around noise floor or a low-level signal with a high-level wideband signal.

In an existing fixed or portable direction finding system using the rotation of directional antennas, an operator should perform scanning and averaging for several times, in order to accurately estimate the direction of a signal.

FIGS. 1 and 2 illustrate a bearing-to-level waveform displayed by the existing digital spectrum analyzer for direction finding.

FIG. 1 illustrates a bearing-to-level waveform at a current mode displayed by the existing digital spectrum analyzer for direction finding, and FIG. 2 illustrates a bearing-to-level waveform at a maxhold mode displayed by the existing digital spectrum analyzer for direction finding.

Referring to FIGS. 1 and 2, the existing digital spectrum analyzer for direction finding can display only a single waveform at an update rate of several tens of frames per second. Therefore, a data loss may occur when the data is processed at a high rate by the spectrum analyzer.

SUMMARY OF THE INVENTION

An embodiment of the present invention is directed to a digital cumulative spectrum analysis apparatus and method for direction finding (DF) and location, which is capable of measuring more than several hundreds of spectrums per second.

Another embodiment of the present invention is directed to a digital cumulative spectrum analysis apparatus and method for DF and location, which updates measured spectrums on a screen in real time to provide a characteristic of an input signal for each bearing which could not be observed in an existing digital spectrum analyzer.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a digital spectrum analysis apparatus for single-channel direction finding includes: a digital processing unit configured to receive a signal, convert the received signal into a digital signal, reduce a sampling rate of the digital signal by using a digital down converter (DDC), and convert the digital signal into a baseband complex signal; a spectrum processing unit configured to map a bearing and a power level of the baseband complex signal into coordinate system, and allocate different colors to the power levels depending on the accumulation ratio of the power levels; and a display unit configured to display the power levels with colors in order to estimate the bearing of the signal.

In accordance with another embodiment of the present invention, a digital spectrum analysis apparatus for multi-channel direction finding, includes: a multi-channel unit configured to convert signals inputted from antennas into digital signals, reduce a sampling rate of the digital signals by using a digital down converter (DDC), and convert the digital signals into baseband complex signals, and having a plurality of channels of which the number is equal to or less than that of the antennas; a DF estimator configured to estimate the direction of the signal using a predetermined direction finding method; a spectrum processing unit configured to map any one of a bearing and a power level of the baseband complex signal into coordinate system, and allocate different colors to one of the bearings and the power levels depending on the accumulation ratio of one of the bearing and the power level in order to estimate the bearing of the signal; and a display unit configured to display the power level and the bearing with colors in order to estimate the bearing of the signal.

In accordance with another embodiment of the present invention, a digital cumulative spectrum analysis apparatus for location includes: a converting unit configured to convert signals inputted from antennas into digital signals, reduce a sampling rate of the digital signals by converting the digital signals into baseband signals through a digital down converter (DDC), and convert the baseband signals into complex digital data; an estimator configured to estimate positions of the signals based on a predetermined location method; a spectrum processing unit configured to map the positions into a complex waveform image map memory, and allocate different colors to the positions depending on the accumulation ratio of the positions; and a display unit configured to display the positions with colors in order to estimate the location of the signal.

In accordance with another embodiment of the present invention, a digital spectrum analysis method for single-channel direction finding, includes: receiving a signal, converting the signal into a digital signal, reducing a sampling rate of the digital signal by using a digital down converter (DDC), and converting the digital signal into a baseband complex signal; calculating a power level of the baseband complex signal to thereby generate data, processing the data by mapping the power level data into coordinate system, and allocating different colors to the data depending on the accumulation ratio of the data; and displaying the power levels with colors in order to estimate the bearing of the signal based on the set display mode.

In accordance with another embodiment of the present invention, a digital spectrum analysis method for multi-channel direction finding in a digital spectrum analysis apparatus including multi-channel unit having multi-channels of which the number is equal to or less than that of the antennas, the digital spectrum analysis method, the digital spectrum analysis method includes: performing a sequential switching to receive signals from the antennas when the number of the channels is smaller than that of the antennas; converting the signals inputted from the antennas into digital signals, reducing a sampling rate of the digital signal by converting the digital signals into baseband signals through a digital down converter (DDC), and converting the baseband signals into complex digital data; converting time-domain samples for the complex digital data into a frequency domain; estimating the direction of the signal based on a predetermined direction finding method; mapping the processed data into a complex waveform image map memory, and allocating different colors to the data depending on the accumulation ratio of one of bearings and power levels of the complex digital data; and displaying power levels or bearings with colors in order to estimate the bearing of the signal.

In accordance with another embodiment of the present invention, a digital spectrum analysis method for location in a digital spectrum analysis apparatus, the digital spectrum analysis method includes: converting signals inputted from antennas into digital signals, reducing a sampling rate of the digital signals by converting the digital signals into baseband signals through a digital down converter (DDC), and converting the baseband signals into complex digital data; estimating position of the signal using a predetermined location method; mapping the positions into a complex waveform image map memory, and allocating different colors to the positions depending on the accumulation ratio of the position; and displaying the positions with colors in order to estimate the location of the signal.

DESCRIPTION OF SPECIFIC EMBODIMENTS

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully cover the scope of the present invention to those skilled in the art. Throughout the disclosure, the numbering for the component is referred consistently throughout the various figures and embodiments of the present invention. The drawings are not necessarily to be scaled and in some instances, proportions may have been exaggerated in order to clearly illustrate features of the embodiments.

The purpose of DF is to determine the exact position of any source of electromagnetic radiation. Several methods such as Triangulation, Time of Arrival (TOA)/Time Difference of Arrival (TDOA) method, and combination of two methods, etc. are used to identify a location of an object. The present invention can be applied to display the result of DF and location.

In case of DF application, estimated bearing can be displayed in real time with various display types such as bearing vs. power level, frequency vs. bearing on the 2D, and bearing vs. power level vs. frequency on the 3D. Different colors are allocated to power levels or bearings depending on the accumulation ratio of them in order to estimate the bearing of the RF signal.

In case of location application, estimated position can be displayed in real time on the map. Different colors are allocated to positions on the map depending on the accumulation ratio of them in order to estimate the location of the RF signal.

Figure 3:
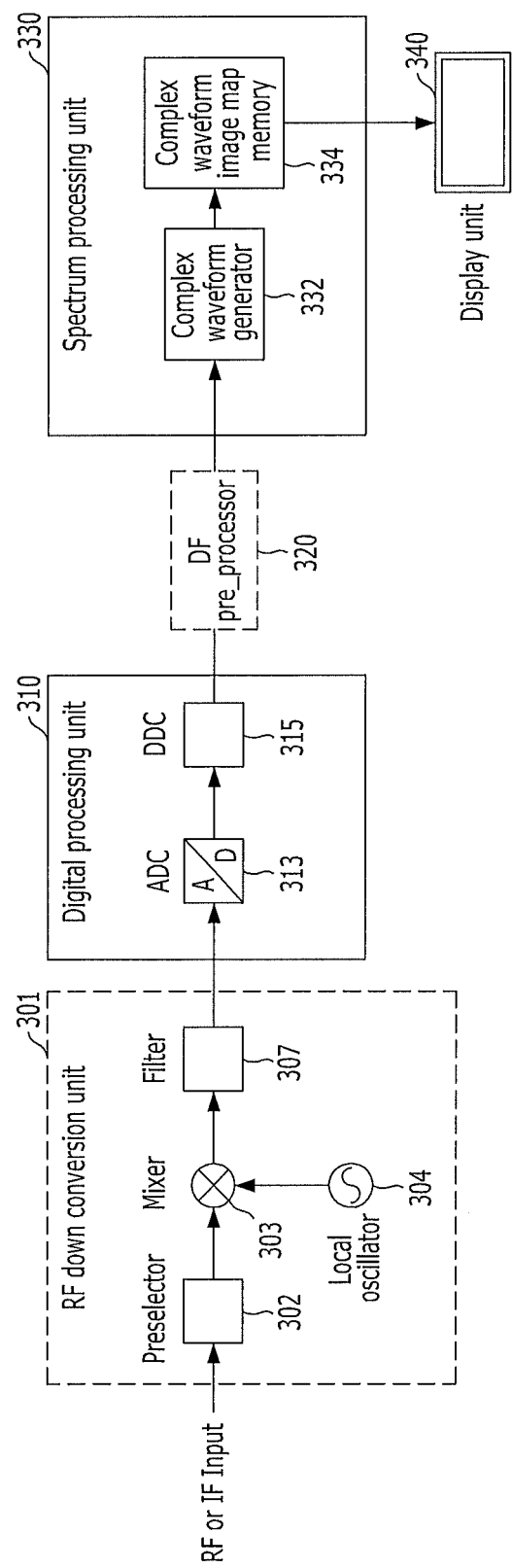
FIG. 3 is a block diagram of a digital cumulative spectrum analyzer for single-channel direction finding in accordance with an embodiment of the present invention.

FIG. 3 is a block diagram of a digital cumulative spectrum analyzer for single-channel direction finding in accordance with an embodiment of the present invention.

The digital cumulative spectrum analyzer for direction finding in accordance with the embodiment of the present invention includes an RF down conversion unit 301, a digital processing unit 310, a direction finding (DF) pre-processor 320, a spectrum processing unit 330, and a display unit 340.

The RF down conversion unit 301 located at a first stage may be selected as an option. It is configured to receive an RF signal from an antenna which is not illustrated and convert the received RF signal into an intermediate frequency (IF) signal for digital signal processing. The RF down conversion unit 301 includes a preselector 302, a mixer 303, a local oscillator 304, and a filter 307.

The preselector 302 which may be selected as an option receives the RF signal received by the antenna unit. The input RF signal includes multiple signals in a variety of frequency. The preselector 302 serving as a tracking filter is located before the mixer 303. The preselector 303 passes only signals within a measurement range according to the preset frequency of the analyzer to input the signals to the mixer 303. That is, the preselector 303 passes only frequencies selected by the analyzer. The desired frequency is set through the selection of the appropriate filter. Through this method, it is possible to detect only a desired frequency among a variety of frequencies. Furthermore, it is possible to prevent a large signal at unwanted frequency from being delivered to the mixer through the input. That is, the preselector 302 serves an additional attenuator configured to protect the mixer 303.

The local oscillator 304 operates as a frequency source which generates a specific frequency, and refers to a frequency source configured to supply a reference frequency to the mixer 303 in an RF system. The local oscillator 304 is a limited oscillator of which the oscillation frequency is determined by the RF input frequency of mixer 303 and the intermediate frequency.

The mixer 303 mixes the reference frequency provided by the local oscillator 304 and the RF signal passed through the preselector 302, and down-converts the mixed signal into an IF signal.

Since the signals converted into the IF signal include various channels, the filter 307 selects only a desired channel among them through band-pass filtering.

The digital processing unit 310 is configured to receive the output signal of the RF down conversion unit 301 and convert the received signal into a baseband signal. The digital processing unit 310 includes an Analog-to-Digital Converter (ADC) 313 and a Digital Down Converter (DDC) 315.

The ADC 313 receives the output signal of the RF down conversion unit 301, and converts the received signal into a digital signal. The DDC 315 converts the digital signal converted by the ADC 313 into a baseband signal, significantly reduces a data sampling rate to cut down the load of the spectrum processing unit 330, and convert the baseband signal into complex digital data.

The DF pre-processor 320 is configured to calculate the power level of the complex digital data at a frequency set by the spectrum analyzer or the power level across a wideband frequency through Fast Fourier Transform (FFT).

The FFT algorithm may be theoretically applied to a periodic function. However, in order to apply the FFT algorithm to a real environment, the window function is used to reduce level leakage which occurs due to the discontinuity caused by non-periodic sampling. The window function is defined by characteristics such as the width of a main lobe and the roll-off rate of a side lobe.

Through the FFT, time-domain samples may be converted into a frequency domain to perform the direction finding across a wideband frequency at a high rate.

The spectrum processing unit 330 processes the multiple data obtained by the DF pre-processor 320 to allow the processed signal to be displayed on the display unit 340 in real time.

The spectrum processing unit 330 includes a complex waveform generator 332, and a complex waveform image map memory 334.

The complex waveform generator 332 is configured to perform waveform pixel mapping and decay processing on power level for each bearing. The waveform pixel mapping is to map complex data into the complex waveform image map memory 334 defining a display window. Various display types such as bearing vs. power level, etc. on the 2D and bearing vs. power level vs. frequency on the 3D are available. As an example among various display types, when the mapping is performed in the complex waveform image map memory 334, an X-axis indicates the bearing, and a Y-axis indicates the power level. Different colors are allocated to the power levels at each bearing, depending on the accumulation ratio of the level, in order to complete the cumulative spectrum.

For example, when the cumulative ratio of the power level is small, a blue color is allocated. When the cumulative ratio of the power level is large, a red color is allocated. Then, it is possible to display a low-level signal around a noise floor or a low-level signal within a high-level wideband signal.

The decay processing may be performed at a persistent mode or an overwrite mode, similar to the current mode or the maxhold mode of the existing digital spectrum analyzer. To detect a signal which is appeared intermittently, the overwrite mode is set to display all power levels at each bearing during a measurement time such that the power level in a new frame is continuously overwritten into an existing frame, until the measurement is stopped. To observe only a current signal, the persistent mode is set to display all current power levels at each bearing so as to be overwritten in a new frame, while reducing power levels in the existing frame.

Figure 4:
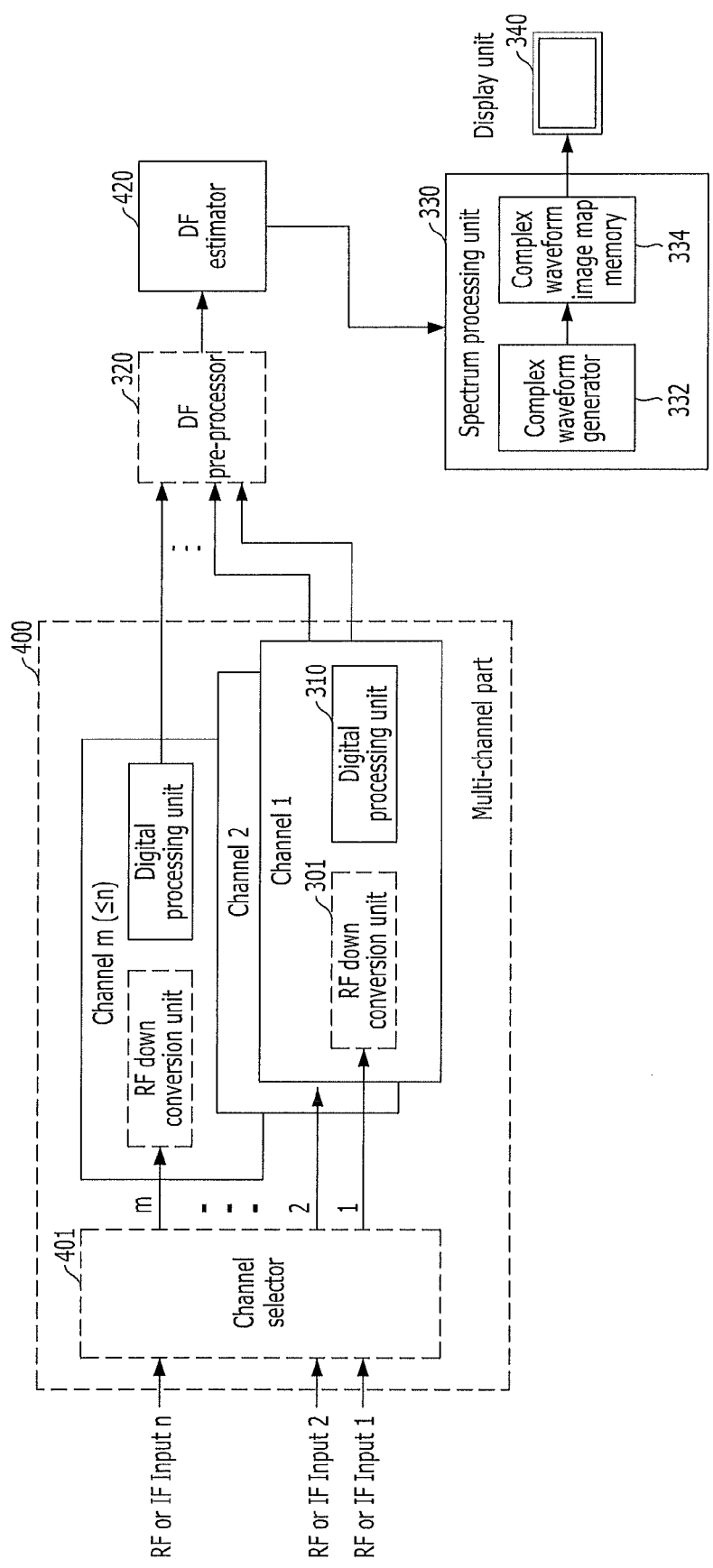
FIG. 4 is a block diagram of a digital spectrum analyzer for multi-channel direction finding in accordance with another embodiment of the present invention.

FIG. 4 is a block diagram of a digital spectrum analyzer for multi-channel direction finding in accordance with another embodiment of the present invention.

The digital spectrum analyzer illustrated in FIG. 4 has a similar configuration to that of the digital spectrum analyzer for single-channel direction finding, and a channel selector 401 and a direction finding (DF) estimator 420 are added to the configuration.

The digital spectrum analyzer for multi-channel direction finding includes multi-channel part 400, the DF pre-processor 320, the DF estimator 420, and a spectrum processing unit 330.

The multi-channel part 400 includes the channel selector 401 and n channels (n is a natural number equal to or lager than 1). Each of the channels includes an RF down conversion unit 301 and a digital processing unit 310. The channel is configured to receive an RF signal from an antenna which is not illustrated.

The channel selector 401 which may be selected as an option is configured to perform a sequential switching for RF signals received from antenna when the number of receiver channels is smaller than that of antennas, in order to reduce the cost for the system. The phase shifter can be added if the multi-channel part 400 has only a single channel.

The RF down conversion unit 301 is configured to convert the received RF signal into an IF signal. The digital processing unit 310 is configured to convert the output signal of the RF down conversion unit 301 into a digital signal. Furthermore, the digital processing unit 310 converts the digital signal into a baseband signal, and reduces a data sampling rate to cut down a load. Then, the digital processing unit 310 converts the baseband signal into the complex digital data.

The DF pre-processor 320 which may be selected as an option is configured to perform Fast Fourier Transform (FFT) before the direction finding estimation in order to estimate the bearing across a wideband frequency at a high rate.

The DF estimator 420 is configured to estimate the direction of a signal by performing various well-known DF methods such as a beamforming, an interferometer, a super-resolution, etc.

The spectrum processing unit 330 is configured to process the digital signal obtained from the DF estimator 420 and display the result on a screen in real time. The spectrum processing unit 330 includes a complex waveform generator 334 and a complex waveform image map memory 334.

The complex waveform generator 332 is configured to perform waveform pixel mapping and decay processing on bearing data for each frequency.

In the waveform pixel mapping, complex data are mapped into the complex waveform image map memory 334 defining a display window. Various display types such as bearing vs. power level, frequency vs. bearing, etc. on the 2D, and bearing vs. power level vs. frequency on the 3D are available. As an example among various display types, when the mapping is performed in the complex waveform image map memory 336, an X-axis indicates the frequency, and a Y-axis indicates the bearing. Different colors are allocated to the bearings estimated at each frequency, depending on the accumulation ratio of each bearing, in order to complete the cumulative spectrum. As described with reference to FIG. 3, when the accumulation ratio of each bearing is small, a blue color is allocated. When the accumulation ratio of each bearing is large, a red color is allocated. Then, it is possible to display multiple signals at various bearings within the desired frequency band.

The decay processing is performed at a persistent mode or an overwrite mode, similar to the current mode or the max-hold mode of the existing digital spectrum analyzer. To detect a signal which is appeared intermittently, the overwrite mode is set to display all power levels at each bearing during a measurement time such that the bearings in a new frame is continuously overwritten into an existing frame, until the measurement is stopped. To observe only a current signal, the persistent mode is set to display all current bearings at each frequency so as to be overwritten in a new frame, while reducing the power levels in the existing frame.

Multiple waveforms are stored in the complex waveform image map memory 334 so as to form a data frame at each display update time. The frame is delivered to a display of the measurement device at a display update rate. Then, the history of power levels or bearing based on the accumulated complex data makes operator feel like an analog display.

A digital cumulative spectrum analyzer for location can be used to fix the position of the RF signal on the map based on the result of multiple DFs or TOA/TDOA method, and combination of two methods, etc. Positions can be displayed in real time on the map. Different colors are allocated to positions on the map depending on the accumulation ratio of the positions in order to estimate the location of the RF signal.

In the digital spectrum analyzer in accordance with the embodiment of the present invention, the high-rate waveform pixel mapping and the decay processing may be performed to obtain a similar effect to that of a display based on an analog CRT. A number of waveforms collected across a bearing span are inputted into a single image buffer at a high rate, and a synthesized waveform is delivered to the display at a frame update rate. Then, it is possible to provide the characteristic of an input signal for each frequency, which could not be observed in the existing digital spectrum analyzer.

Figure 5:
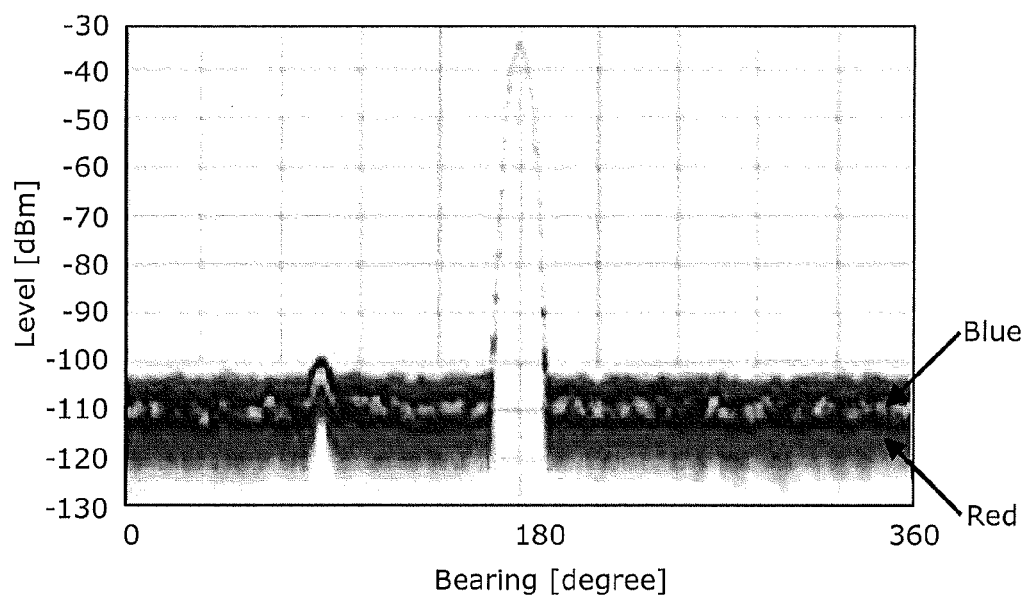
FIG. 5 is a diagram illustrating a bearing-to-level waveform displayed by the digital cumulative spectrum analyzer for single-channel direction finding in accordance with the embodiment of the present invention.

FIG. 5 is a diagram illustrating a bearing-to-level waveform displayed by the digital cumulative spectrum analyzer for single-channel direction finding in accordance with the embodiment of the present invention.

Figure 1:
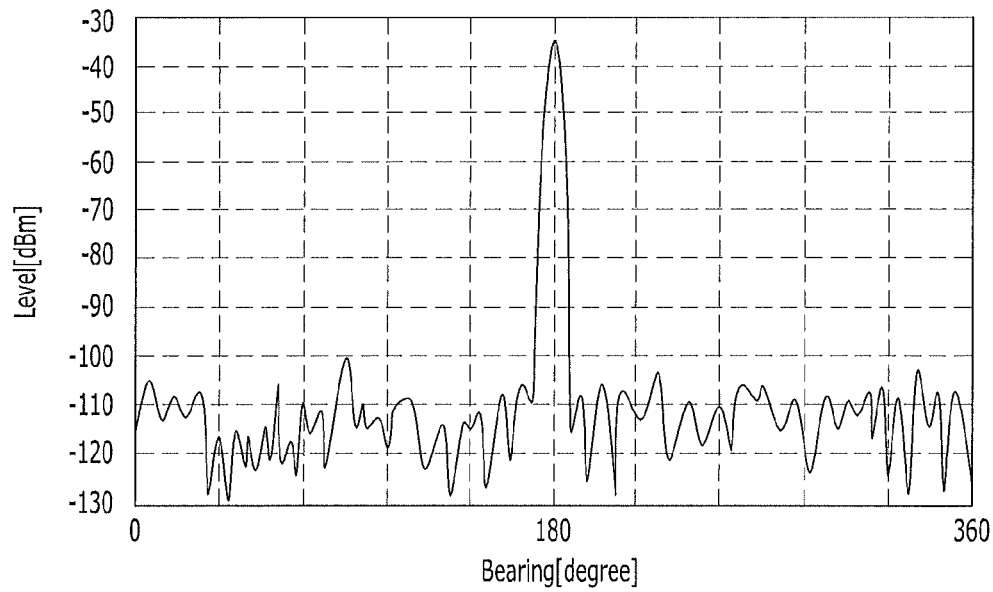
FIG. 1 illustrates a bearing-to-level waveform at a current mode displayed by an existing digital spectrum analyzer for direction finding.
Figure 2:
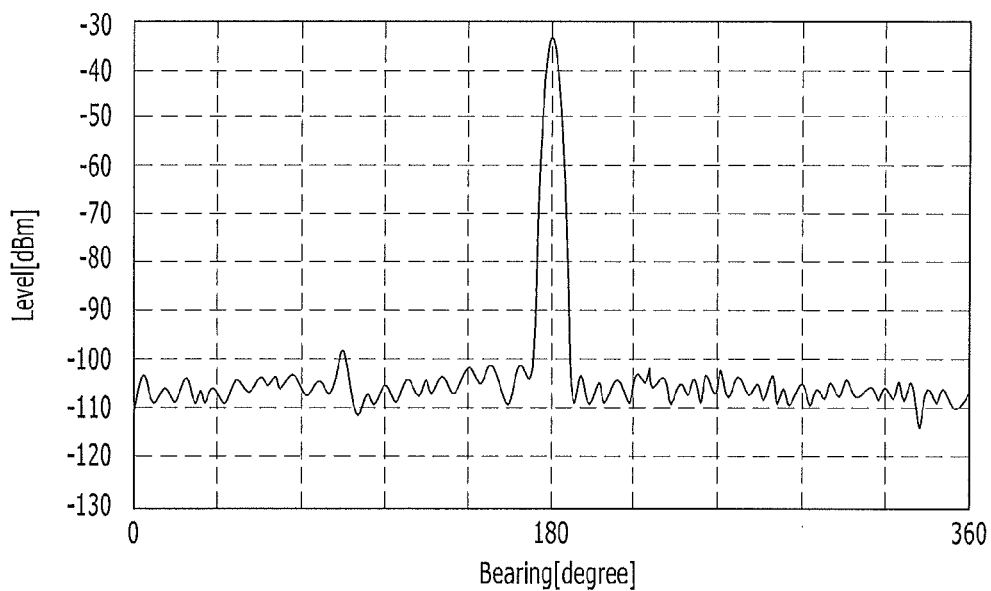
FIG. 2 illustrates a bearing-to-level waveform at a maxhold mode displayed by the existing digital spectrum analyzer for direction finding.

In FIG. 5, the digital cumulative spectrum analyzer for direction finding displays a low-level signal, which could not be clearly observed through a single waveform as illustrated in FIGS. 1 and 2, through a complex waveform using the cumulative spectrum.

Figure 6:
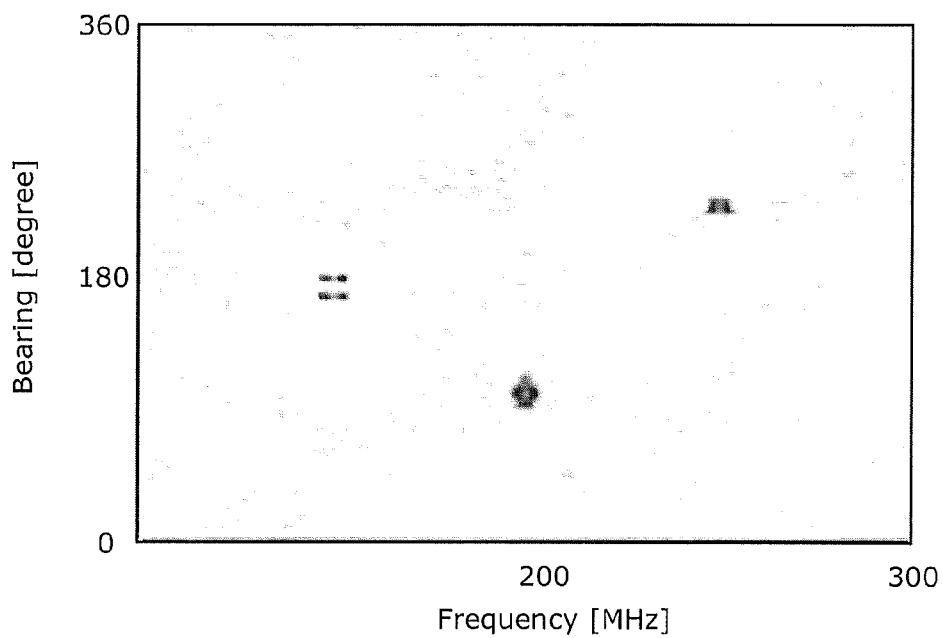
FIG. 6 is a diagram illustrating a frequency-to-bearing waveform displayed by the digital cumulative spectrum analyzer for multi-channel direction finding in accordance with the embodiment of the present invention.

FIG. 6 is a diagram illustrating a frequency-to-bearing waveform displayed by the digital cumulative spectrum analyzer for multi-channel direction finding in accordance with the embodiment of the present invention.

Referring to FIG. 6, the digital cumulative spectrum analyzer for multi-channel direction finding displays a complex waveform obtained by accumulating multiple bearing across a frequency span at a waveform update rate, when performing the multi-channel direction finding function. When the digital cumulative spectrum analyzer for direction finding in accordance with the embodiment of the present invention is used, the large amount of data outputted from the digital processing unit 310 at a high rate is displayed on the screen without a loss. Therefore, the direction of a signal may be more accurately estimated through only single scanning. Furthermore, it is possible to improve the system performance remarkably in terms of sensitivity, accuracy, speed, and multiple signal detection. In accordance with the embodiments of the present invention, as the spectrums are stored in the memory in real time so as to detect and estimate the bearing or location of a transmitted signal, the measurement and analysis may be performed easily. Furthermore, it is possible to detect a low-level signal around a noise floor and observe a low-level within a high-level wideband signal.

The spectrum analysis apparatus for location can be used to fix the position of the RF signal on the map based on the result of multiple DFs or TDOA method, and combination of two methods. Positions can be displayed in real time on the map. Different colors are allocated to positions on the map depending on the accumulation ratio of them in order to estimate the location of the RF signal.

While the present invention has been described with respect to the specific embodiments, it will be apparent to those skilled in the art that various changes and modifications may be made without departing from the spirit and scope of the invention as defined in the following claims.

What is claimed is:

1. A digital spectrum analysis apparatus for single-channel direction finding, comprising:
   a digital processing unit configured to receive a signal, convert the received signal into a digital signal, reduce a sampling rate of the digital signal by using a digital down converter (DDC), and convert the digital signal into a baseband complex signal;
   a spectrum processing unit configured to map a bearing and a power level of the baseband complex signal into a coordinate system, and allocate different colors to the power levels depending on the accumulation ratio of the power levels; and a display unit configured to display the power levels with colors in order to estimate the bearing of the signal.

2. The digital spectrum analysis apparatus of claim 1, wherein the spectrum processing unit includes:

a complex waveform image map memory configured to map a bearing and a power level into an X-axis and a Y-axis, and allocate different colors to power levels depending on the accumulation ratio of the power levels in order to estimate the bearing of the signal.

3. The digital spectrum analysis apparatus of claim 1, wherein the spectrum processing unit includes:

a complex waveform image map memory configured to map a bearing, a power level and a frequency into an X-axis, a Y-axis and Z-axis, and allocating different colors to power levels depending on the accumulation ratio of the power levels in order to estimate the bearing of the signal.

4. The digital spectrum analysis apparatus of claim 1, further comprising:

a frequency down conversion unit configured to perform down-conversion of the signal received from an antenna into a down-converted signal having a lower frequency than that of the signal, and provide the down-converted signal to the digital processing unit.

5. The digital spectrum analysis apparatus of claim 1, further comprising:

a DF pre-processor configured to calculate the power level of the baseband complex signal at the preset frequency, and provide the calculated power level to the spectrum processing unit.

6. The digital spectrum analysis apparatus of claim 1, further comprising:

a DF pre-processor configured to convert time-domain into a frequency domain for the signal in order to perform the direction finding across a wideband frequency at a high rate, and provide the processed data to the spectrum processing unit.

7. A digital spectrum analysis method for single-channel direction finding, comprising:

receiving a signal, converting the signal into a digital signal, reducing a sampling rate of the digital signal by using a digital down converter (DDC), and converting the digital signal into a baseband complex signal;

calculating a power level of the baseband complex signal to thereby generate data, processing the data by mapping the power level data into a coordinate system, and allocating different colors to the data depending on the accumulation ratio of the data; and displaying the power levels with colors in order to estimate the bearing of the signal based on the set display mode.

8. The digital spectrum analysis method as recited in claim 7, wherein the power level of the baseband complex signal is calculated at a preset frequency by a spectrum analyzer.

9. The digital spectrum analysis method as recited in claim 7, wherein the power level of the baseband complex signal is calculated across a wideband frequency through Fast Fourier Transform (FFT).

* * * * *